(12) United States Patent
Yan et al.

(10) Patent No.: US 8,805,181 B2
(45) Date of Patent: Aug. 12, 2014

(54) METHOD AND DEVICE FOR REALIZING INTERACTION OF OPTICAL CHANNEL DATA UNIT PROTECTION TANGENT RINGS

(75) Inventors: Jun Yan, Shenzhen (CN); Gen Chen, Shenzhen (CN); Bo Zhang, Shenzhen (CN); Da He, Shenzhen (CN); Yu Zeng, Shenzhen (CN); Zhenyu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 678 days.

(21) Appl. No.: 12/979,161

(22) Filed: Dec. 27, 2010

(65) Prior Publication Data
US 2011/0091201 A1 Apr. 21, 2011

Related U.S. Application Data

(63) Continuation of application No. PCT/CN2009/072329, filed on Jun. 18, 2009.

(30) Foreign Application Priority Data

Jun. 27, 2008 (CN) .......................... 2008 1 0127545

(51) Int. Cl.
| | |
|---|---|
| *H04B 10/00* | (2013.01) |
| *H04Q 11/00* | (2006.01) |
| *H04J 14/02* | (2006.01) |
| *H04J 3/08* | (2006.01) |
| *H04L 12/437* | (2006.01) |
| *H04J 14/00* | (2006.01) |
| *H04J 3/16* | (2006.01) |

(52) U.S. Cl.
CPC ............... *H04J 3/085* (2013.01); *H04J 3/1652* (2013.01); *H04Q 11/0062* (2013.01); *H04J 14/0283* (2013.01); *H04Q 2011/009* (2013.01); *H04Q 2011/0081* (2013.01); *H04Q 2011/0092* (2013.01); *H04J 2203/006* (2013.01); *H04L 12/437* (2013.01); *H04J 14/0293* (2013.01)

USPC ........................... 398/3; 398/1; 398/2; 398/4

(58) Field of Classification Search
USPC .................... 398/1–8; 370/222–224
See application file for complete search history.

(56) References Cited

U.S. PATENT DOCUMENTS 6,661,800 B1    12/2003 Hayama et al.
(Continued)

FOREIGN PATENT DOCUMENTS

| CN | 1798084 A | 7/2006 |
|---|---|---|
| CN | 101145839 A | 3/2008 |
| EP | 1777845 A1 | 4/2007 |

OTHER PUBLICATIONS

Bin, Yan "Approach to Interworking of SDH Self-Healing Ring Network" Apr. 2006 Telecom Engineering Technics and Standardization. China Academic Journal Electronic Publishing House: 48-51.

(Continued)

*Primary Examiner* — Daniel Dobson
(74) *Attorney, Agent, or Firm* — Brinks Gilson & Lione

(57) ABSTRACT

A method for realizing interaction of optical channel data unit (ODUk) protection tangent rings are provided. A node used for protection of the ODUk and a receiving unit, a sending unit, a protected receiving unit and a protected sending unit on the node are selected. A connection between a receiving service unit and the protected sending unit with the same transmission direction on the node is established, or a connection between a sending service unit and the protected receiving unit with the same transmission direction on the node is established. Two virtual nodes are established on the node if the node is an intersection node, and connections between the receiving service unit and the protected sending unit, and between the sending service unit and the protected receiving unit are established respectively in each direction of both directions through one of the virtual nodes.

4 Claims, 10 Drawing Sheets

(56) References Cited

U.S. PATENT DOCUMENTS

| | | | |
|---|---|---|---|
| 7,035,203 B2 | 4/2006 | Licata et al. | |
| 7,209,975 B1 | 4/2007 | Zang et al. | |
| 7,269,346 B1 | 9/2007 | Iyer et al. | |
| 2006/0140625 A1* | 6/2006 | Ooi et al. | 398/19 |
| 2007/0292129 A1* | 12/2007 | Yan et al. | 398/5 |
| 2009/0175618 A1 | 7/2009 | Yan | |

OTHER PUBLICATIONS

"Series G.: Transmission Systems and Media, Digital Systems and Networks—Digital Transmission Systems—Digital Networks—SDH Network Characteristics" ITU-T Telecommunication Standardization Sector. Apr. 1997.

International Search Report issued in corresponding PCT Application No. PCT/CN2009/072239; mailed Sep. 17, 2009.

Written Opinion of the International Searching Authority issued in corresponding PCT Patent Application No. PCT/CN2009/072329, mailed Sep. 17, 2009.

Extended European Search Report issued in corresponding PCT Patent Application No. 09768761.0, mailed Jul. 15, 2011.

* cited by examiner

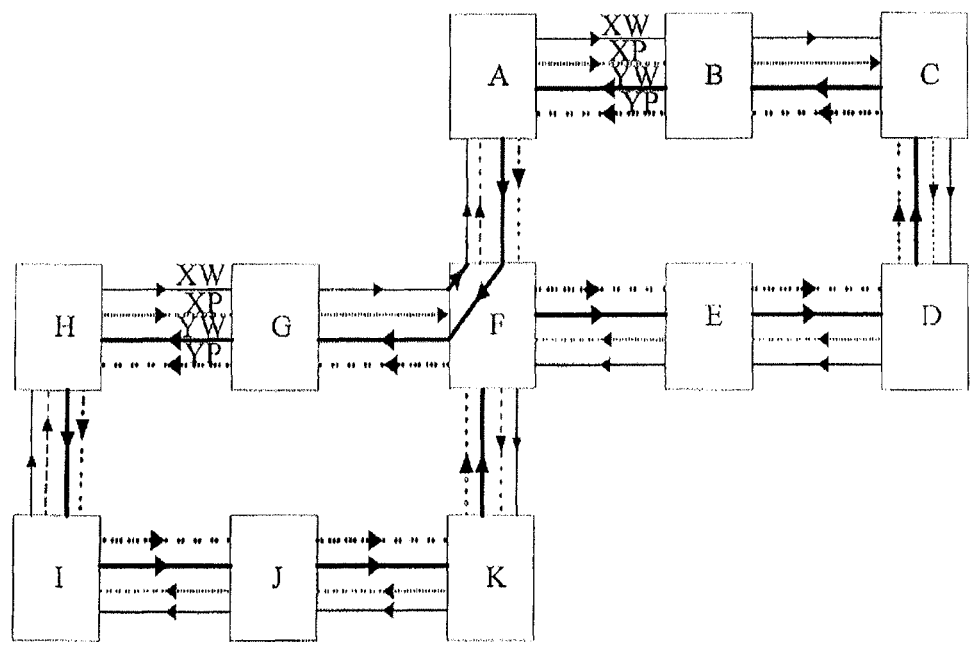
FIG. 1 (Prior Art)
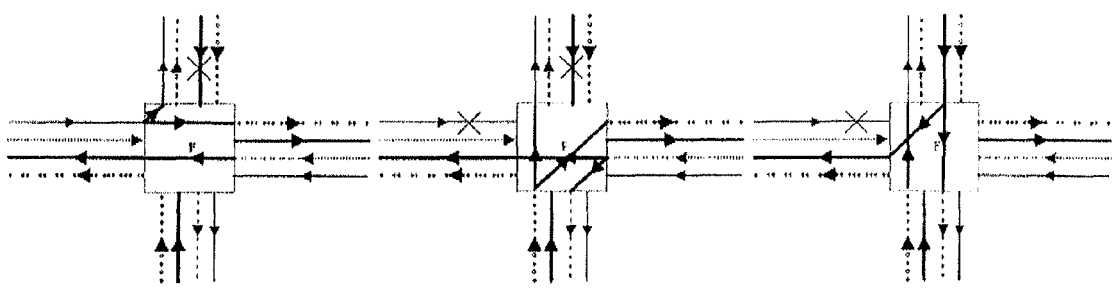
FIG.1 (a)( Prior Art)　　　FIG.1 (b)( Prior Art)　　　FIG.1 (c)( Prior Art)

METHOD AND DEVICE FOR REALIZING INTERACTION OF OPTICAL CHANNEL DATA UNIT PROTECTION TANGENT RINGS

CROSS-REFERENCE TO THE RELATED APPLICATIONS

This application is a continuation of International Application No. PCT/CN2009/072329, filed on Jun. 18, 2009, which claims priority to Chinese Patent Application No. 200810127545.3, filed on Jun. 27, 2008, both of which are hereby incorporated by reference in their entireties.

FIELD OF THE DISCLOSURE

The present disclosure relates to the field of optical communications technologies, and more particularly to a method and a device for realizing optical channel data unit (ODUk) protection tangent rings.

BACKGROUND

ODUk protection tangent rings are generally adopted for service interaction in order to realize end-to-end service protection across two or more ring networks. At present, commonly used ODUk protection tangent rings are an ODUk shared protection ring (ODUk SPRing) tangent rings, and a networking mode is as follows: tangent rings formed by two ODUk SPRings, or tangent rings formed by an ODUk SPRing and an ODUk subnet connection protection ring (ODUk SNCP). FIG. 1 is a schematic networking diagram of tangent rings of two ODUk SPRings in the prior art. Referring to FIG. 1, a first ODUk SPRing and a second ODUk SPRing constitute tangent rings, where the two ODUk SPRings share a node in common (referred to as "intersection node" for short hereinafter), i.e., node F in FIG. 1. The first ODUk SPRing is composed of nodes such as F, G, H, I, J and K, and the second ODUk SPRing is formed by nodes such as A, B, C, D, E and F. Each node in each ODUk SPRing has two working units (referred to as "sending working unit" for short hereinafter) and two protecting units (referred to as "sending protection unit" for short hereinafter) in a sending direction. The sending working units are channels for sending signals normally, and the sending protection units are channels for sending signals replacing the sending working unit when the sending working units fail. Likewise, each node also has two receiving working units and two receiving protection units for receiving signals in a receiving direction.

When a service 1 from node G through node F to node A and a service 2 from node A through node F to node G exist, the interaction method of the ODUk SPRing tangent rings in the prior art is as shown in FIG. 1. Service 1 is sent from the sending working unit of node G to the receiving working unit of node F, and is then sent from the sending working unit of node F to the receiving working unit of node A. The case is similar for service 2.

In general, if the transmission from the sending working unit of node A in the second ODUk SPRing of the tangent rings to node F fails, the second ODUk SPRing need to switch the service transmission, that is, the service on the broken path is switched by node A to a sending protection unit in another sending direction on node A, and is then sent by the sending protection unit to node F, and is then transmitted by the sending working unit of node F to the first ODUk SPRing. At the same time, after switching, service 1 to be sent to the second ODUk SPRing on node F can be sent to node A through node F according to the original path, and may also be sent to node E by the protection unit in another sending direction of node F, and then sent to node A from node E. The state after switching is as shown in FIG. 1(a). Likewise, if the transmission from node G in the first ODUk SPRing to node F fails, the state after switching is as shown in FIG. 1(c). However, if both the transmission from node G in the first ODUk SPRing to node F and the transmission from node A in the second ODUk SPRing to node F fail, the state after switching is as shown in FIG. 1(b).

It can be seen that, for tangent rings, when path breakage occurs on one ring in the tangent rings, two different switching states described above may exist depending on the state of the other ring. For example, when failure occurs between node A and node F in the second ODUk SPRing, two switching states as shown in FIG. 1(a) and FIG. 1(b) may exist. When failure occurs between node G and node F in the first ODUk SPRing, two switching states as shown in FIG. 1(b) and FIG. 1(c) may exist. In the prior art, when path breakage occurs on one of the tangent rings, the state of the other ring needs to be acquired first through interaction by using the APS protocol, that is, to determine whether the other ring also fails, and then select a corresponding switching method according to the state of the other ring. However, the prior art has the following problems.

When switching the first ODUk SPRing in the tangent rings network, interaction need to be first performed by using the APS protocol, and the switching method can only be determined after the state of the second ODUk SPRing is determined. However, the state of the second ODUk SPRing cannot be obtained in real time through the APS protocol, because the state of the second ODUk SPRing can only be determined after all nodes on the ring are interacted by using the APS protocol. This period of time to interact with all nodes on the ring may be very long, so that the switching time is too long to be acceptable for the first ODUk SPRing. If the switching of the first ODUk SPRing is determined before the state of the second ODUk SPRing after interaction by using the APS protocol is obtained, the switching state of the second ring need to be presumed, and the first ring is switched according to this presumption. However, when the switching state of the second ring is actually determined, it may not be the same as the presumed state. As a result, multiple times of switching may occur, thus resulting in errors during switching, thereby the interaction between the tangency rings cannot be realized normally. The same problem exists in the tangent rings formed by the ODUk SPRing and the ODUk SNCP.

SUMMARY

The present disclosure is directed to a method and a device for realizing interaction of ODUk protection tangent rings, which are capable of realizing the following effects. The protected services are not interrupted, multiple times of switching will not occur, and switching will be quick when a link in the ODUk protection tangent rings fails.

In an embodiment, the present disclosure provides a method for realizing interaction of ODUk protection tangent rings, which includes the following steps.

A node used for protection of the ODUk and a receiving unit, a sending unit and a protected receiving unit, a protected sending unit on the node are selected.

A connection between a receiving service unit and the protected sending unit with the same transmission direction on the node is established, or a connection between a sending service unit and the protected receiving unit with the same transmission direction on the node is established.

Two virtual nodes are established on the node when the node is an intersection node, and connections between the receiving service unit and the protected sending unit, and between the sending service unit and the protected receiving unit are established respectively on each direction of the two directions one of the virtual nodes.

Based on the above features, in an embodiment, the present disclosure further provides a device for realizing interaction of ODUk protection tangent rings, which includes a selecting unit, a virtual node establishing unit and a connecting unit.

The selecting unit is configured to select a node used by the ODUk protection tangent rings and a receiving service unit, a sending service unit, a protected receiving unit and a protected sending unit on the node.

The virtual node establishing unit is configured to establish two virtual nodes on the node when the node is an intersection node, and establish connections between the receiving service unit and the protected sending unit, and between the sending service unit and the protected receiving unit, respectively on each direction of the two directions through one of the virtual nodes.

The connecting unit is configured to establish a connection between the receiving service unit and the protected sending unit with the same transmission direction on the node, or establish a connection between the sending service unit and the protected receiving unit with the same transmission direction on the node.

In the embodiments of the present disclosure, two virtual nodes are set up on the intersection node of the tangent rings, and connections between the service units on the intersection node are established through the virtual nodes. In this manner, when the transmission of the tangent rings fails and needs to be switched on the intersection node, only the cross connection between the service unit and the virtual node used by the failed ring on the intersecting node needs to be changed, while the connection between the service unit and the virtual node used on a non-failed ring does not need to be changed. Therefore, the state of the non-failed ring does not need to be queried by using the APS protocol.

BRIEF DESCRIPTION OF THE DRAWINGS

FIG. 1 is a schematic networking diagram of tangent rings of two ODUk SPRings in the prior art;

FIG. 1(a), FIG. 1(b) and FIG. 1(c) are schematic diagrams of interaction states after switching of the tangent rings shown in FIG. 1, respectively;

DETAILED DESCRIPTION OF THE EMBODIMENTS

The specific implementations of the present disclosure are described in further detail below with reference to the accompanying drawings.

Figure 2:
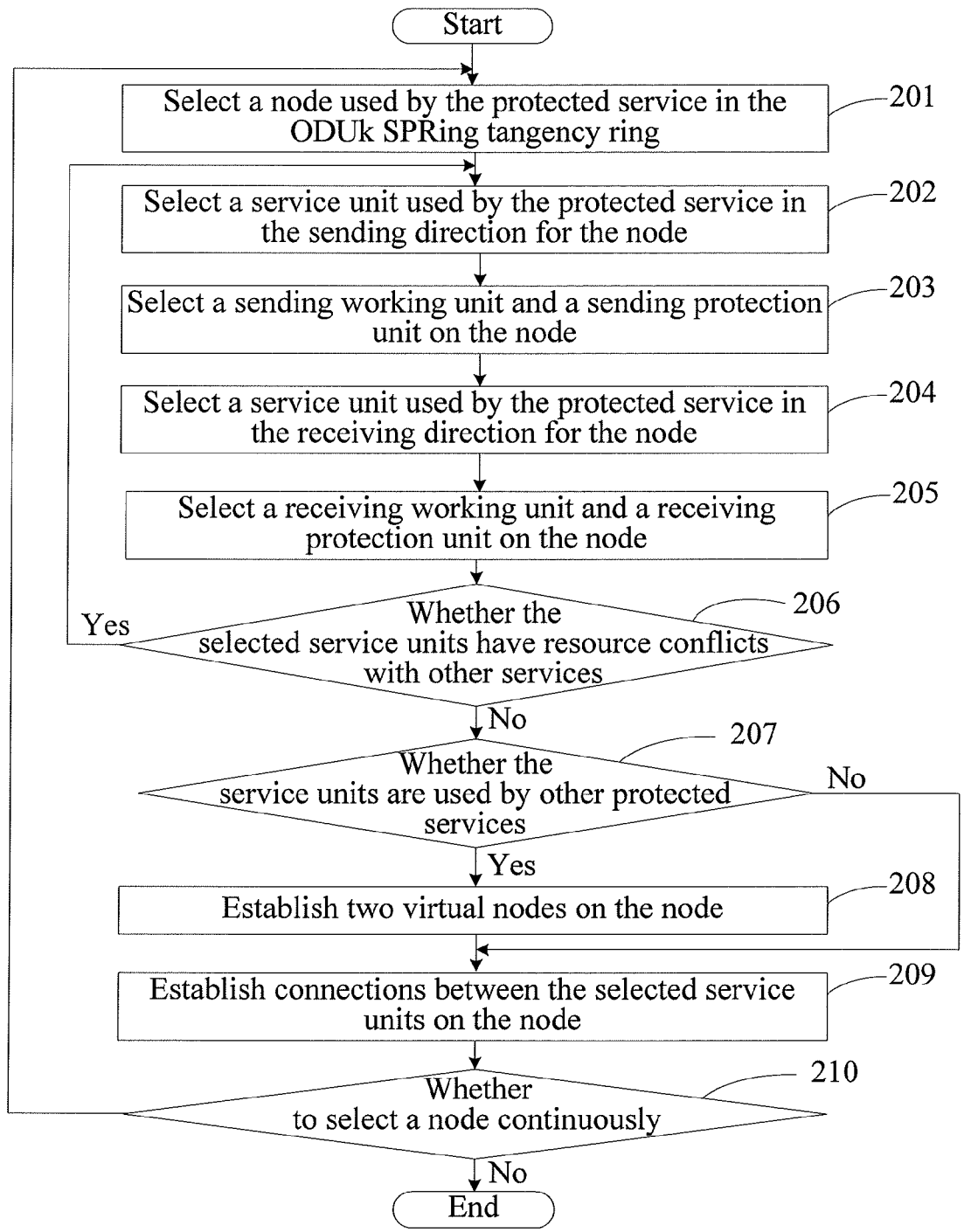
FIG. 2 is a flow chart of a method embodiment for realizing interaction of ODUk SPRing tangent rings according to the present disclosure.

According to an interaction method of ODUk protection tangent rings of the present disclosure, virtual points and cross connections based on the virtual points are established on an intersection node shared by two tangent rings. In this manner, a single node switching can be directly performed without querying the state of the other ring by using the ASP protocol when switching. FIG. 2 is a flow chart of a method embodiment for realizing interaction of ODUk SPRing tangent rings according to the present disclosure. Referring to FIG. 2, the method includes the following steps when being applied in an ODUk SPRing.

In S201, a node used by a protected service in the ODUk SPRings is selected. The node is switchable in the tangent rings, for example, for the ODUk SPRing in the tangent rings, any node in the ODUk SPRing can be selected; for an ODUk SNCP in the tangent rings, a source node or a sink node in the ODUk SNCP through which the protected service is transmitted can be selected.

In S202, a sending service unit used by the protected service (referred to as "protected sending unit" for short hereinafter) is selected for the node. The protected sending unit may be a tributary unit or a line unit. For example, in the ODUk SPRing, any node other than an intersection node may have eight service units, and one of the eight service units can be selected as the protected sending unit. The protected sending unit serves as an interface from the current node to an adjacent node for sending the service in the current node to the adjacent node.

In S203, a sending working unit and a sending protection unit are selected on the node. For example, four sending service units are selected for the ODUk SPRing, including two sending working units, and two sending protection units, which can be called as a first sending working unit, a second sending working unit, and a first sending protection unit and a second sending protection unit, respectively. The first sending working unit and the first sending protection unit face one transmission direction of the ring, and the second sending working unit and the second sending protection unit face the other transmission direction of the ring. For the ODUk SNCP, two sending service units are selected, including one sending working unit and one sending protection unit.

In S204, a receiving service unit used by the protected service (referred to as "protected receiving unit" for short hereinafter) is selected for the node. The protected receiving unit may be the same service unit as the protected sending unit selected in S202, and other service units may also be selected. The protected receiving unit serves as an interface from the present node to an adjacent node for receiving the service from the adjacent node.

In S205, a receiving working unit and a receiving protection unit are selected on the node. For example, two receiving service units and two receiving protection units are selected for the ODUk SPRing, which can be called as a first receiving working unit, a second receiving working unit, and a first receiving protection unit and a second receiving protection unit, respectively. The first receiving working unit and the first receiving protection unit face one transmission direction of the ring, and the second receiving working unit and the second receiving protection unit face the other transmission direction of the ring. For the ODUk SNCP, one receiving working unit and one receiving protection unit are selected.

The receiving working unit and the receiving protection unit may be the same service units as the sending working unit and the sending protection unit selected in S203, and other service units may also be selected.

In S206, whether the selected service units have resource conflicts with other services is determined, and if the selected service units do not have resource conflicts with other services, S207 is performed; if the selected service units have resource conflicts with other services, the S202 is returned to select the service units on the node again.

In S207, whether the service units on the node are used by other protected services is determined, and if the service units on the node are used by other protected services, the node is the intersection node of the tangent rings, and S208 is performed; if the service units on the node are not used by other protected services, S209 is performed.

In S208, two virtual nodes are established on the node. After that, S209 is performed.

The virtual nodes are respectively used in two service transmission directions on the node, that is, one virtual node serves as the last node in one service transmission direction, and the other virtual node serves as the first node in the other service transmission direction.

In S209, connections between the selected service units are established, that is, a connection between the receiving service unit and the protected sending unit with the same transmission direction on the node is established, or a connection between the sending service unit and the protected receiving unit with the same transmission direction on the node is established. If the node is the intersection node, connections between the service units need to be established through the virtual nodes.

In S210, whether to select a node continuously is determined, and if it is determined to select a node continuously, S201 and subsequent steps are performed again; if it is determined not to select a node continuously, the process ends.

In the above embodiment, the virtual nodes are established on the intersection node, and one virtual node is set up on each transmission direction, so that the protected service passes through the virtual node when being transmitted between the two rings of the tangent rings. In this manner, the two rings are bonded via the virtual nodes, thus coupling relations of different protections are reduced, that is, when one of the rings is being switched, the state of the other ring does not need to be determined by using the APS protocol. Therefore, switching time can be shortened and protection reliability can be improved. Meanwhile, since the virtual nodes may not occupy the cross ports outside of the node where they are located, cross resources can be saved.

In addition, the order of selecting the service units in the sending direction on the node in S202 and selecting the service units in the receiving direction on the node in S204 in the above embodiment are not limited to the above sequence. For example, the following sequence is also practical: First, the service units in the receiving direction are selected on the node, and corresponding receiving working unit and receiving protection unit are selected in the receiving service unit. Then, the service units in the sending direction on the node are selected, and corresponding sending working unit and sending protection unit are selected in the sending service unit.

The above embodiment is directed to the ODUk SPRing. Furthermore, for the ODUk SNCP, the method has the same steps, except that steps S203 and S205 are not included. The method will not be repeated herein.

Figure 3:
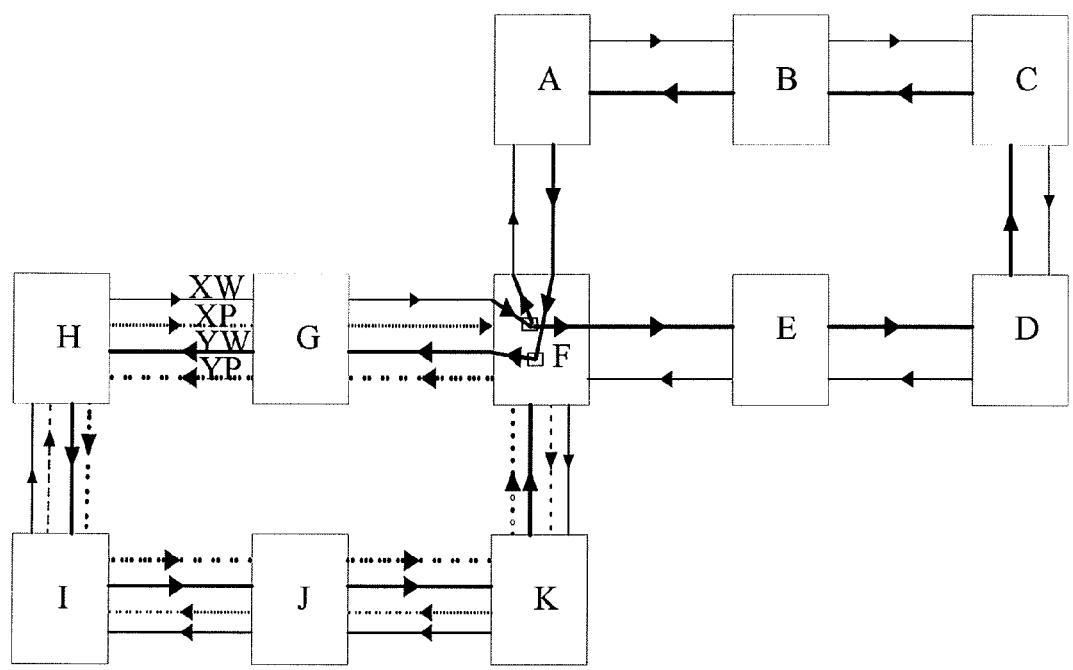
FIG. 3 is a schematic networking diagram of tangent rings of an ODUk SPRing and an ODUk SNCP in the prior art.
Figure 4:
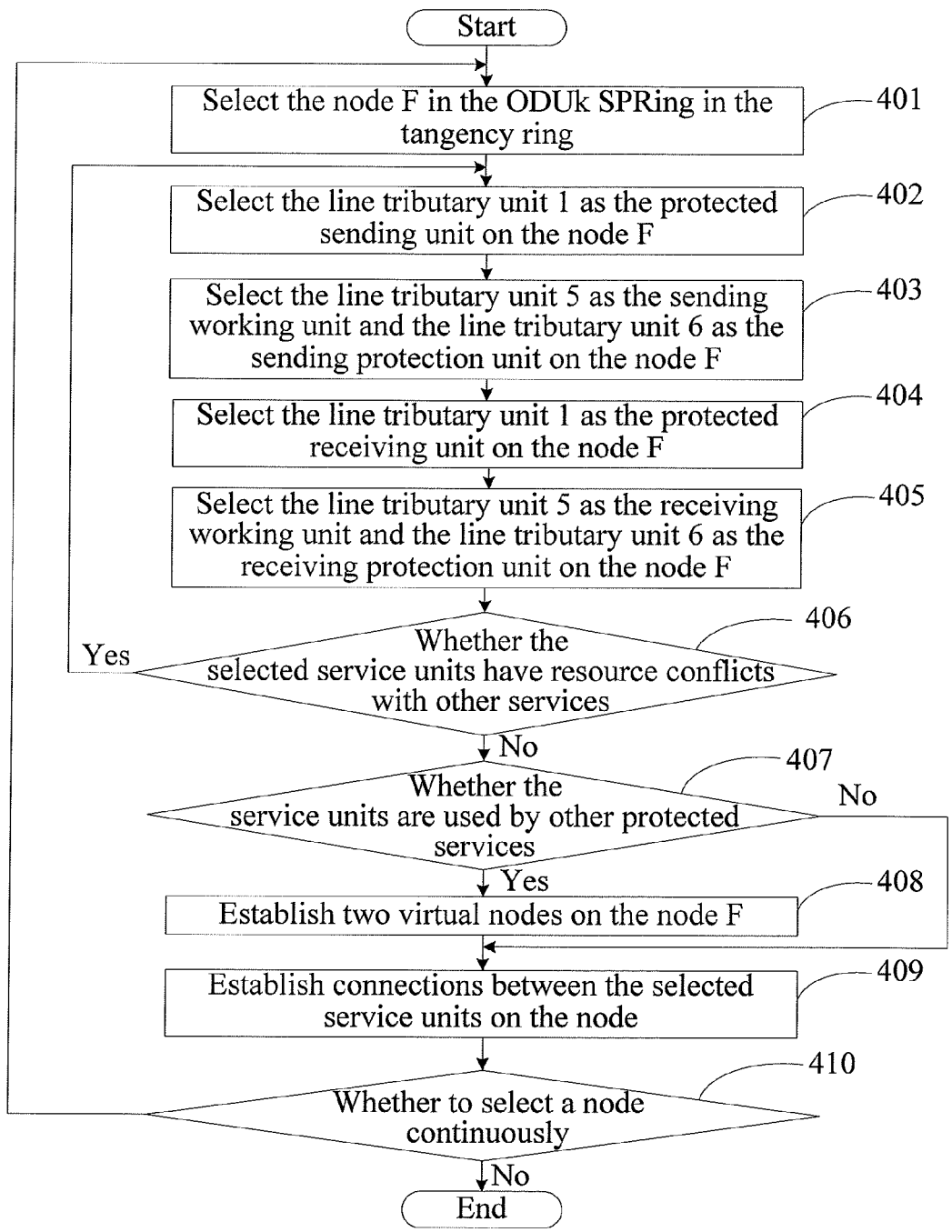
FIG. 4 is a flow chart of a method embodiment for realizing interaction of ODUk SNCPs in tangent rings according to the present disclosure.

Examples are taken below to respectively illustrate the specific application of the above method in tangent rings. For example, in the tangent rings of an ODUk SPRing and an ODUk SNCP as shown in FIG. 3, the flow of the method for the ODUk SNCP in the tangent rings is as shown in FIG. 4. The method includes the following steps.

In S401, a node used by a protected service in the ODUk SNCP is selected, where the node is switchable in the tangent rings. For example, node F is selected.

Figure 5:
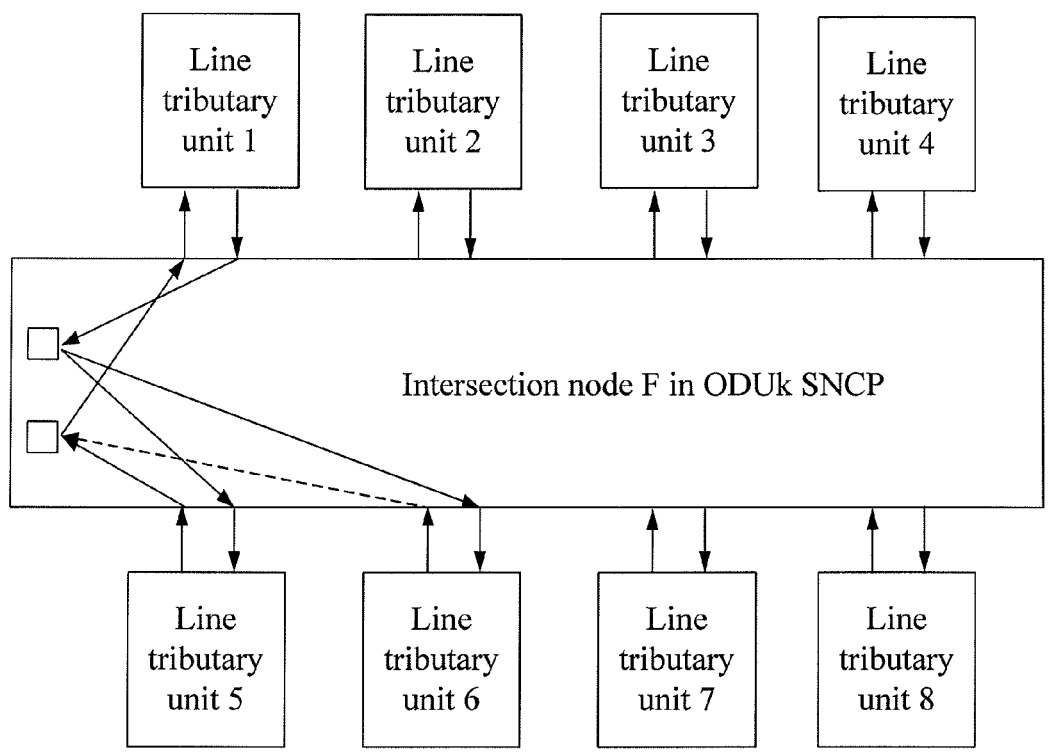
FIG. 5 is a schematic diagram of a connection state on an intersection node obtained by the methods of FIG. 4 and FIG. 6 according to the present disclosure.

In S402, a protected sending unit is selected for node F. The protected sending unit on node F serves as an interface for service transmission with the other ring other than the ODUk SNCP in the tangent rings, for sending the service to the other ring other than the ODUk SNCP in the tangent rings. For example, among the eight line tributary service units of node F as shown in FIG. 5, a line tributary unit 1 is selected as the protected sending unit.

In S403, a sending working unit and a sending protection unit are selected on node F. The sending working unit faces one transmission direction of the ring, and the sending protection unit faces the other transmission direction of the ring. For example, among the eight line tributary service units of node F as shown in FIG. 5, a line tributary unit 5 is selected as the sending working unit, and a line tributary unit 6 is selected as the sending protection unit.

In S404, a protected receiving unit is selected for node F. For example, in this embodiment, the line tributary unit 1 is still selected as the protected receiving unit.

In S405, a receiving working unit with the same transmission direction as the sending working unit and a receiving protection unit with the same transmission direction as the sending protection unit are selected on node F. For example, among the eight line tributary service units of node F as shown in FIG. 5, the line tributary unit 5 is still selected as the receiving working unit, and the line tributary unit 6 is still selected as the receiving protection unit.

In S406, whether the selected service units have resource conflicts with other services is determined, and if the selected service units do not have resource conflicts with other services, S407 is performed; if the selected service units have resource conflicts with other services, the process returns to S402 to select the service unit on the node F again.

In S407, whether the service units on node F are used by other protected services is determined, and if the service units on node F are used by other protected services, the node is the intersection node of the tangent rings, and S408 is performed; if the service units on node F are not used by other protected services, S409 is performed.

In S408, in this embodiment, since node F is an intersection node, two virtual nodes are established on node F. After that, S409 is performed.

The virtual nodes are respectively used in two service transmission directions on the node, that is, one virtual node serves as the last node in one service transmission direction, and the other virtual node serves as the first node in the other service transmission direction.

In S409, connections between the selected service units are established on intersection node F. For example, as shown in FIG. 3, for the transmission direction from intersection node F to node A, the protected sending unit of the line tributary unit 1 on intersection node F is connected to the receiving service unit of the line tributary unit 5 through the first virtual node. Likewise, the protected receiving unit of the line tributary unit 1 is connected to the sending service unit of the line tributary unit 5 through the second virtual node. The connection modes of the other nodes are same, and will not be repeated herein.

After the connections between the various selected service units on the intersection node F are established, a schematic diagram of a connection state as shown in FIG. 5 is obtained. It can be known from the above method embodiment that, the line tributary unit 1 in FIG. 5 serves as a protected unit, and has the protected sending unit and the protected receiving unit integrated on the line tributary unit 1. The line tributary unit 5 serves as a working unit for service receiving and sending in the transmission direction from intersection node F to node A, and has the sending service unit and the receiving service unit in the transmission direction integrated on the line tributary unit 5. The line tributary unit 6 serves as a protection unit for service receiving and sending in the transmission direction from intersection node F to node E, and has the sending protection unit and the receiving protection unit in the transmission direction from node F to node E integrated on the line tributary unit 6.

In S410, whether to select a node continuously is determined, and if it is determined to select a node continuously, S401 and subsequent steps are performed again; if it is determined not to select a node continuously, the process ends.

Figure 6:
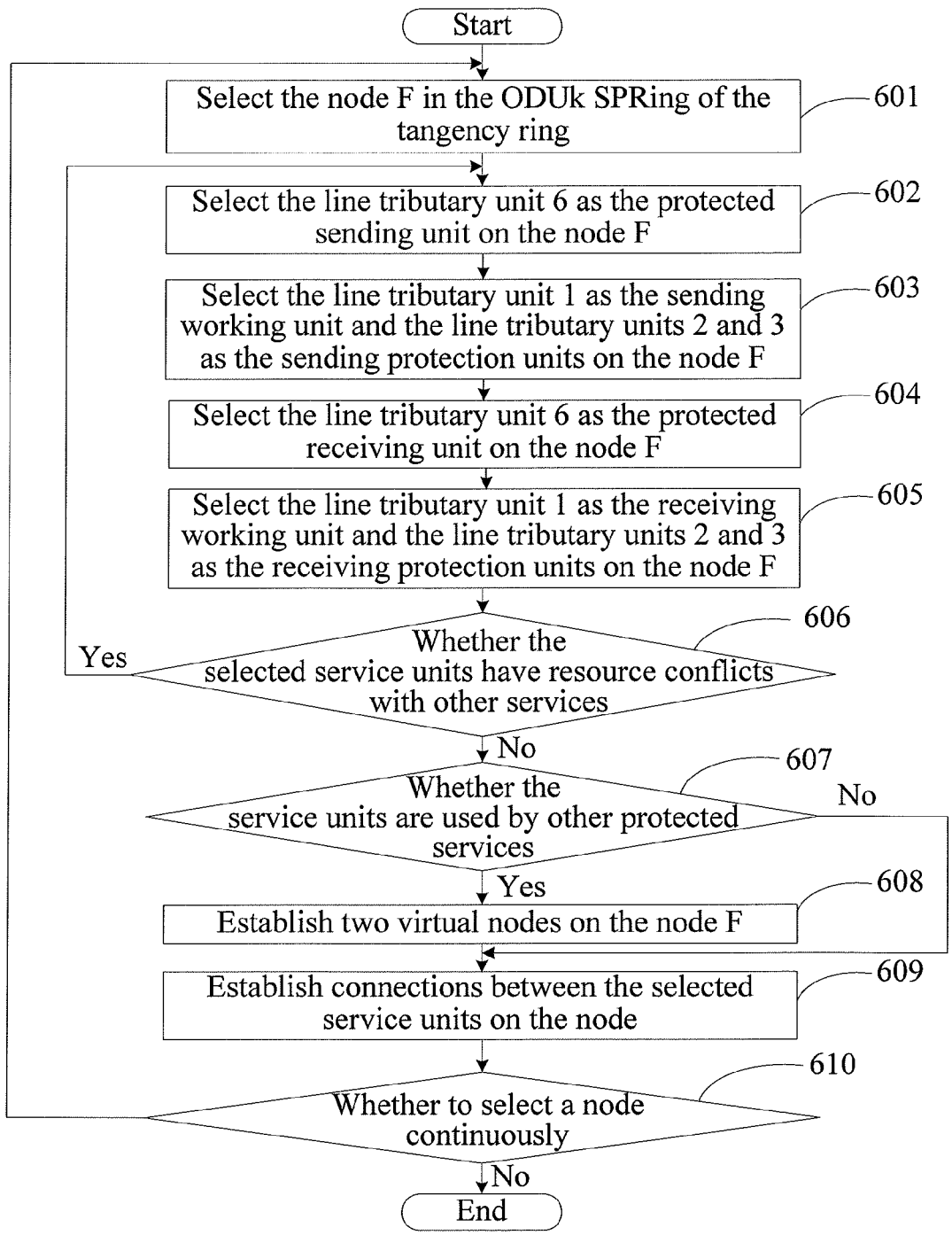
FIG. 6 is a flow chart of a method embodiment for realizing interaction of ODUk SPRings in tangent rings according to the present invention.

The method embodiment for realizing interaction of the ODUk SNCP in the tangent rings of the ODUk SPRing and the ODUk SNCP is described above. For the ODUk SPRing in the tangent rings, the flow of the method for realizing interaction of the ODUk SPRing is as shown in FIG. 6. The method includes the following steps.

In S601, a node used by a protected service in the ODUk SPRing is selected; the node is switchable in the tangent rings. For example, node F is still selected in this embodiment.

In S602, a protected sending unit is selected for node F. The protected sending unit on node F serves as an interface for service transmission with the other ring other than the ODUk SPRing in the tangent rings, for sending the service to the another ring other than the ODUk SPRing in the tangent rings. For example, among the eight line tributary service units of node F as shown in FIG. 5, a line tributary unit 6 is selected as the protected sending unit.

In S603, a first sending working unit and a second sending working unit with two different transmission directions, and a first sending protection unit and a second sending protection unit with the two different transmission directions are selected on node F. Definitely, if node F has a service in one transmission direction only, only the sending working unit and the sending protection unit in the service transmission direction are selected. For example, among the eight line tributary service units of node F as shown in FIG. 5, the line tributary unit 1 is selected as the sending working unit, and a line tributary unit 2 and a line tributary unit 3 are selected as the sending protection units in different transmission directions respectively.

In S604, a protected receiving unit is selected for node F. For example, in this embodiment, the line tributary unit 6 is still selected as the protected receiving unit.

In S605, a first receiving working unit and a second receiving working unit with two different transmission directions, and a first receiving protection unit and a second receiving protection unit with the two different transmission directions are selected on node F. Definitely, if node F has a service in one transmission direction only, only the receiving working unit and the receiving protection unit in the service transmission direction are selected. For example, among the eight line tributary service units of the intersection node F as shown in FIG. 5, the line tributary unit 1 is still be selected as the receiving working unit, and the line tributary unit 2 and the line tributary unit 3 are selected as the receiving protection units in two transmission directions respectively.

In S606, whether the selected service units have resource conflicts with other services is determined, and if the selected service units do not have resource conflicts with other services, S607 is performed; if the selected service units have resource conflicts with other services, the process returns to S602 to select the service unit on the node F again.

In S607, whether the service unit on the node F is used by other protected services is determined. If the service unit on the node F is used by other protected services, the node is the intersection node on the tangent rings, and S608 is performed; if the service unit on the node F is not used by other protected services, S609 is performed.

In S608, in this embodiment, since node F is an intersection node, two virtual nodes are established on node F. After that, S609 is performed.

The virtual nodes are respectively used in two service transmission directions on the node, that is, one virtual node serves as the last node in one service transmission direction, and the other virtual node serves as the first node in the other service transmission direction.

In S609, connections between the selected service units on intersection node F are established, and a schematic diagram of a connection state as shown in FIG. 5 is obtained. It can be known from the above method embodiment that, the line tributary unit 6 in FIG. 5 serves as a protected unit, and has the protected sending unit and the protected receiving unit integrated on the line tributary unit 6. The line tributary unit 1 serves as a working unit for service receiving and sending in the transmission direction from intersection node F to node G, and has the sending working unit and the receiving working unit in the transmission direction integrated on the line tributary unit 1. The line tributary unit 2 serves as a protection unit for service receiving and sending in the transmission direction from intersection node F to node G, and has the sending protection unit and the receiving protection unit in the transmission direction from node F to node G integrated on the line tributary unit 2. The line tributary unit 3 serves as a protection unit for service receiving and sending in the transmission direction from intersection node F to node K, and has the sending protection unit and the receiving protection unit in the transmission direction from node F to node K integrated on the line tributary unit 3.

In S610, whether to select a node continuously is determined, and if it is determined to select a node continuously, S601 and subsequent steps are performed again; if it is determined not to select a node continuously, the process ends.

The connection modes between the nodes as shown in FIG. 5 can be obtained through the above method for interaction of the tangent rings as shown in FIG. 4 and FIG. 6. When the transmission link from node A to intersection node F in the ODUk SNCP of the tangent rings fails, intersection node F in the ODUk SNCP may be switched based on FIG. 5, to enable the service on the failed link to be switched to other paths, so as to be transmitted to intersection node F. The switching method of intersection node F is as follows.

The service on the failed path is no longer received by the receiving service unit of the line tributary unit 5 on intersection node F in the ODUk SNCP, but is received by the receiving protection unit of the line tributary unit 6 on node F instead of the receiving service unit of the line tributary unit 5. In this manner, the service transmission direction is changed from the original direction from node A directly to intersection node F into the direction from node A through nodes B, C, D and E to intersection node F.

Figure 7:
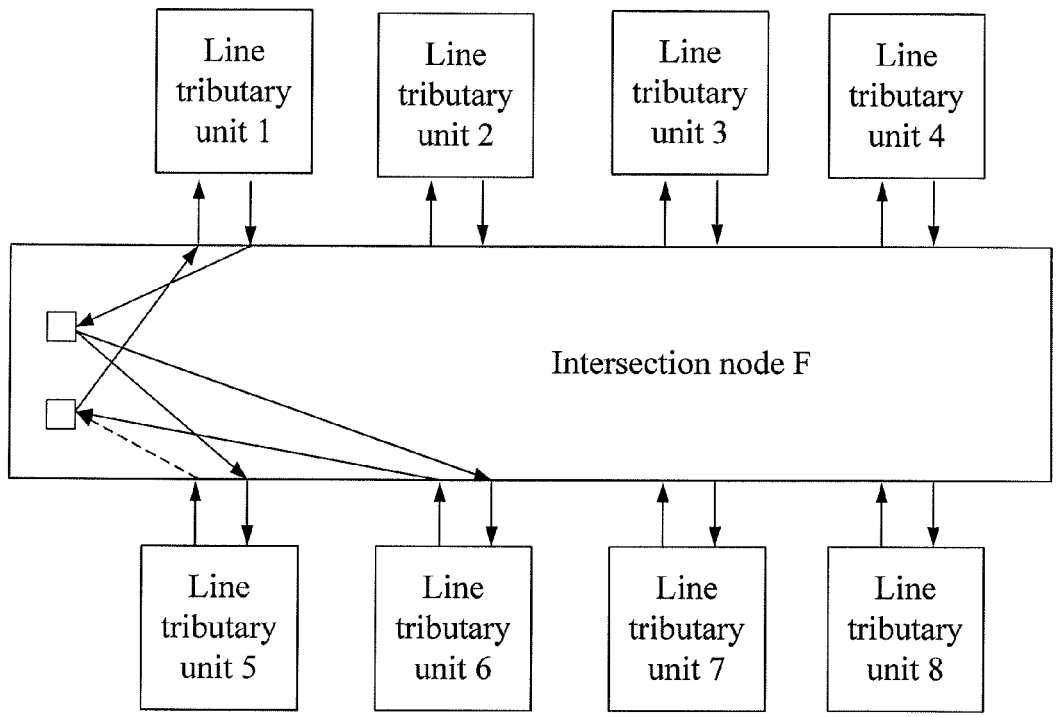
FIG. 7 is a schematic diagram of a connection state on an intersection node after switching of ODUk SNCPs according to the present disclosure.
Figures 8A, 8B, 8C:
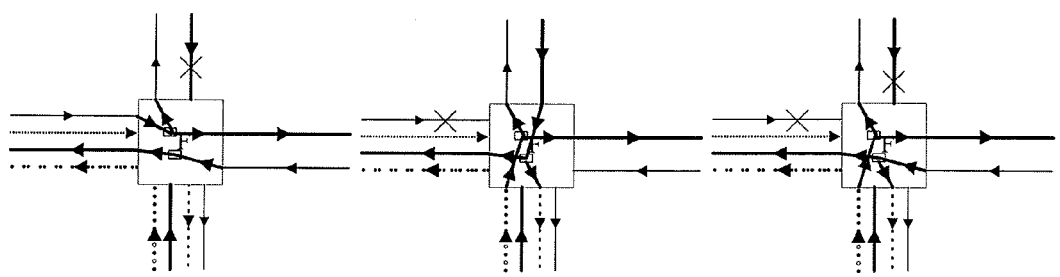
FIG. 8(a) is a schematic diagram of interaction of an intersection node in networking after switching of ODUk SNCPs according to the present disclosure.
FIG. 8(b) is a schematic diagram of interaction of the intersection node in networking after switching of ODUk SPRings according to the present disclosure.
FIG. 8(c) is a schematic diagram of interaction of the intersection node in networking after switching of both an ODUk SNCP and an ODUk SPRing according to the present disclosure.

The connection state of the service units on intersection node F after switching is as shown in FIG. 7. In the above embodiment, the ODUk SNCP only changes the cross connection relations between the line tributary unit 5, the line tributary unit 6 and the virtual nodes, rather than changing the cross connection relations between the line tributary unit 5, the line tributary unit 6 and the protected unit 1 as in the prior art. In this embodiment, the cross connection relations of the virtual points and the line tributary units 1 to 3 used by the ODUk SPRing remain unchanged. Therefore, it can be easily seen from the schematic diagram of interaction of intersection node F on the tangent rings after switching as shown in FIG. 8(a), in the present invention, when the ODUk SNCP in the tangent rings is switched, the cross connection relations between the line tributary units and the virtual nodes used by the ODUk SNCP needs to be changed only without querying the state of the ODUk SPRing by using the APS protocol, and the interaction mode on the intersection node F of the ODUk SPRing remains unchanged, thus the coupling relations between different protections are reduced, the processing complexity is reduced, the switching time is shortened, and the protection reliability is improved.

Likewise, the connection modes between the nodes as shown in FIG. 5 can be obtained through the above method for interaction of the tangent rings as shown in FIG. 4 and FIG. 6. When the transmission link from node G to intersection node F in the ODUk SPRing of the tangent rings fails, intersection node F in the ODUk SPRing may be switched based on FIG. 5, to enable the service on the failed link to be switched to other paths, so as to be transmitted to intersection node F. The switching method of intersection node F is as follows.

The service on the failed path is no longer received by the receiving service unit of the line tributary unit 1 on the intersection node F in the ODUk SPRing, but is received by the receiving protection unit of the line tributary unit 3 on node F instead of the receiving service unit of the line tributary unit 1. In this manner, the service transmission direction is changed from the original direction from node G directly to intersection node F into the direction from node G through nodes H, I, J and K to intersection node F.

Figure 9:
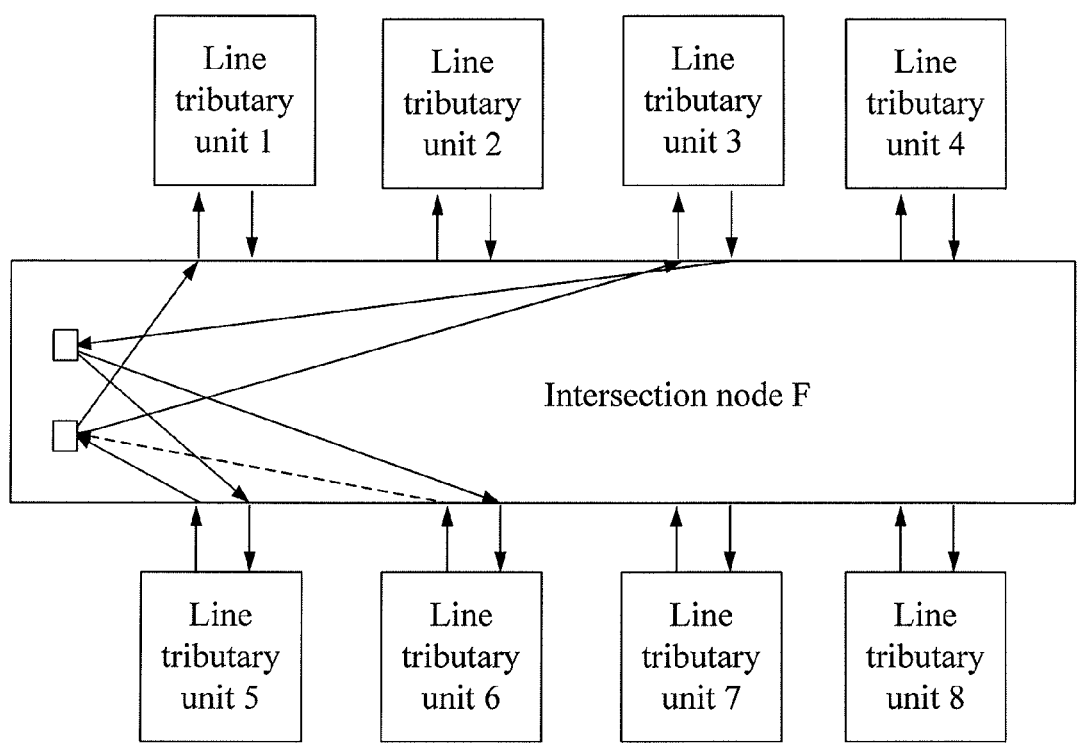
FIG. 9 is a schematic diagram of a connection state on an intersection node after switching of ODUk SPRings according to the present disclosure.

The connection state of the service units on the intersection node F after switching is as shown in FIG. 9. In the above embodiment, only the cross connection relations between the line tributary units 1 to 3 and the virtual nodes used by the ODUk SPRing are changed, rather than changing the cross connection relations between the line tributary units 1 to 3 and the protected unit 6 as in the prior art. In this embodiment, the cross connection relations of the virtual points and the line tributary units 5 and 6 used by the ODUk SNCP remain unchanged. Therefore, it can be easily seen from the schematic diagram of interaction of intersection node F on the tangent rings after switching as shown in FIG. 8(b), in the present disclosure, when the ODUk SPRing in the tangent rings is switched, the cross connection relations between the line tributary units used by the ODUk SPRing needs to be changed only without querying the state of the ODUk SNCP by using the APS protocol, and the interaction mode on intersection node F of the ODUk SNCP remains unchanged, thus the coupling relations between different protections are reduced, the processing complexity is reduced, the switching time is shortened, and the protection reliability is improved.

Figure 10:
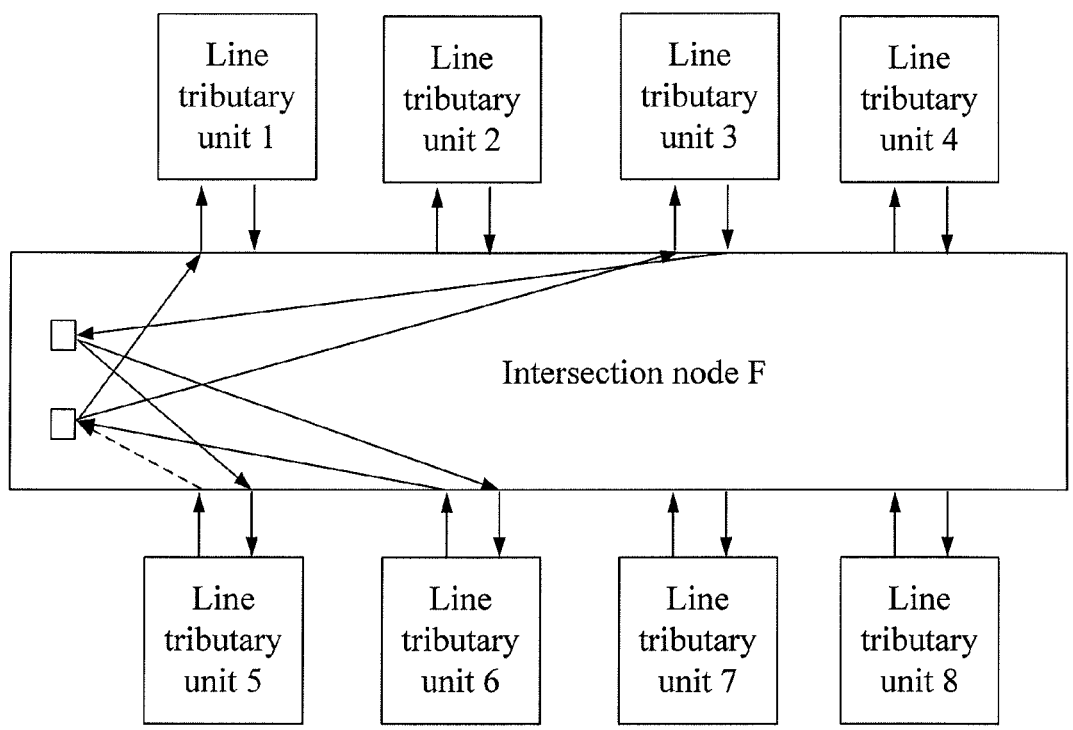
FIG. 10 is a schematic diagram of a connection state on an intersection node after switching of both an ODUk SNCP and an ODUk SPRing according to the present disclosure.

Likewise, based on the connection modes between the nodes shown in FIG. 5, when both the transmission link from node G to intersection node F in the ODUk SPRing of the tangent rings and the transmission link from node A to intersection node F in the ODUk SNCP of the tangent rings fail, switching can be performed according to the above switching methods for the ODUk SNCP and the ODUk SPRing. The connection state of the service units on intersection node F after switching is as shown in FIG. 10, where the cross connection relations between the line tributary unit 5, the line tributary unit 6 and the virtual points used by the ODUk SNCP as shown in FIG. 7 are changed, and the cross connection relations between the line tributary units 1 to 3 and the virtual points used by the ODUk SPRing as shown in FIG. 9 are also changed. FIG. 8(c) is a schematic diagram of interaction of intersection node F after switching of the tangent rings. In this embodiment, when both of the two rings in the tangent rings need to be switched because of link failure, switching needs to be performed respectively only according to the switching method of a sing ring, and the interaction state after switching is the sum of the interaction states after switching of individual rings. Therefore, when switching need to be performed in the tangent rings, the failed ring only needs to be switched according to its interaction mode without considering the state of the other ring, thus the coupling relations between different protections are reduced, the processing complexity is reduced, the switching time is shortened, and the protection reliability is improved.

Figure 11:
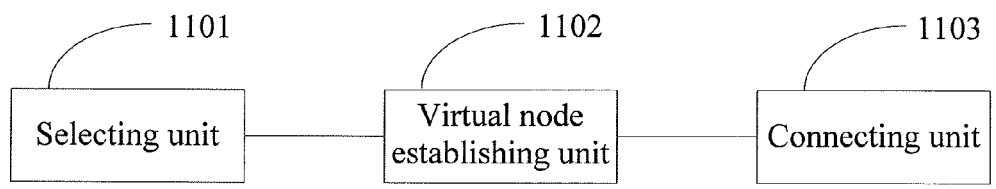
FIG. 11 is a schematic block diagram of a device for realizing interaction of ODUk SPRing tangent rings according to the present disclosure.

Based on the above embodiments, in another embodiment, the present disclosure further provides a device for realizing interaction of ODUk SPRing tangent rings. For an intersection node shared by two tangent rings, the device establishes two virtual nodes on the intersection node, in addition to service units for being used by the tangent rings for the intersection node. All the service units are cross-connected with the virtual nodes, in this manner, when switching, single mode switching can be directly performed without querying the state of the other ring in the tangent rings by using the APS protocol. FIG. 11 is a schematic block diagram of a device for realizing interaction of ODUk SPRing tangent rings according to the present invention. Referring to FIG. 11, the device includes a selecting unit 1101, a virtual node establishing unit 1102 and a connecting unit 1103.

The selecting unit 1101 is configured to select a node used by a protected service of the ODUk protection tangent rings and a receiving service unit, a sending service unit and a protected receiving unit, a protected sending unit on the node. The node is switchable in the tangent rings. For example, for an ODUk SPRing in the tangent rings, any node in the ODUk SPRing can be selected; for an ODUk SNCP in the tangent rings, a source node or a sink node in the ODUk SNCP through which the protected service is transmitted can be selected. The selected node further includes an intersection node used by the two rings in the tangent rings.

For the ODUk SPRing in the tangent rings, the selecting unit 1101 selects a sending service unit (that is, protected sending unit) used by the protected service, and a sending working unit and a sending protection unit on the intersection node. For example, a first sending working unit and a second sending working unit with two different transmission directions, and a first sending protection unit and a second sending protection unit with the two different transmission directions are selected.

Meanwhile, a receiving service unit (that is, protected receiving unit) used by the protected service in the ODUk SPRing and a receiving working unit and a receiving protection unit are selected on the node. For example, a first receiving working unit and a second receiving working unit with two different transmission directions, and a first receiving protection unit and a second receiving protection unit with the two different transmission directions are selected.

For the ODUk SNCP in the tangent rings, the selecting unit 1101 selects a sending service unit used by the protected service in the ODUk SNCP, and a sending working unit and a sending protection unit with a different transmission direction from the sending working unit on the intersection node.

Meanwhile, a receiving service unit used by the protected service in the ODUk SNCP, and a receiving working unit with the same transmission direction as the sending working unit and a receiving protection unit with the same transmission direction as the sending protection unit are selected on the node.

The virtual node establishing unit 1102 is configured to establish two virtual nodes on the node when the node selected by the selecting unit 1101 is an intersection node, and establish connections between the receiving service unit, the sending service unit and the protected receiving unit, the protected sending unit on each direction of the two directions through one of the virtual nodes. The virtual nodes are respectively used in two service transmission directions on the node, that is, one virtual node serves as the last node in one service transmission direction, and the other virtual node serves as the first node in the other service transmission direction.

The connecting unit 1103 is configured to establish a connection between the receiving service unit and the protected sending unit with the same transmission direction on the node, or establish a connection between the sending service unit and the protected receiving unit with the same transmission direction on the node.

For example, for the shared protection ring ODUk SPRing in the tangent rings, the receiving service unit used by the protected service is connected to the first sending service unit and the second sending service unit respectively through one virtual node, and the sending service unit used by the protected service is connected to the first receiving service unit and the second receiving service unit respectively through the other virtual node.

For the ODUk SNCP in the tangent rings, the receiving service unit used by the protected service is connected to the sending service unit through one virtual node, and the sending service unit used by the protected service is connected to the receiving service unit through the other virtual node.

Figure 12:
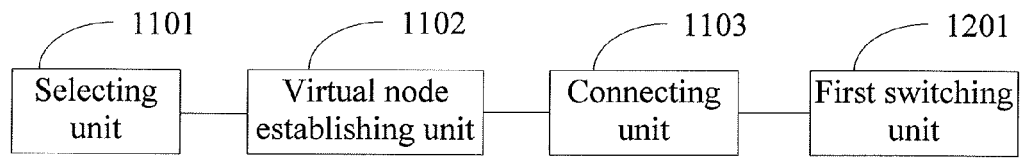
FIG. 12 is a schematic block diagram of another device for realizing interaction of ODUk SPRing tangent rings according to the present disclosure.

In addition, based on the above device embodiment, the present disclosure further provides another device, which enables a failed ring in the contingency ring that only needs to be switched according to its interaction mode without considering the state of the other ring. FIG. 12 is a schematic structural block diagram of another device embodiment of the present disclosure. Referring to FIG. 12, when a link failure occurs on the shared protection ring ODUk SPRing in the tangent rings, based on the embodiment shown in FIG. 11, the device further includes a first switching unit 1201.

The first switching unit 1201 is configured to switch the cross connections between the service units used by the ODUk SPRing on the intersection node and the virtual nodes according to a connection result of the intersection node with the connecting unit 1103. For example, a specific switching method may refer to the switching of the ODUk SPRing based on FIG. 5 when the transmission link from node G to intersection node F in the ODUk SPRing of the tangent rings fails in the above method embodiment, and will not be repeated herein.

Figure 13:
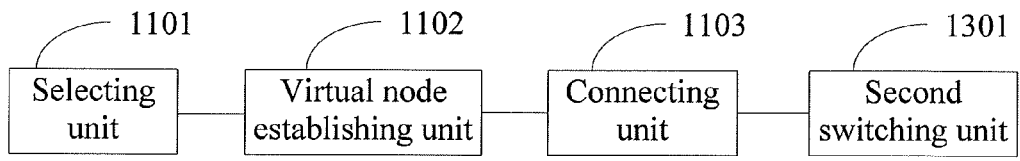
FIG. 13 is a schematic block diagram of still another device for realizing interaction of ODUk SPRing tangent rings according to the present disclosure.

In addition, based on the above device embodiment, the present disclosure further provides another device, which enables a failed ring in the contingency ring only to be switched according to its interaction mode without considering the state of the other ring. FIG. 13 is a schematic structural block diagram of another device embodiment of the present invention. Referring to FIG. 13, when a link failure occurs on the ODUk SNCP in the tangent rings, based on the embodiment shown in FIG. 11, the device further includes a second switching unit 1301.

The second switching unit 1301 is configured to switch the cross connections between the service units used by the ODUk SNCP on the intersection node and the virtual nodes according to a connection result of the intersection node with the connecting unit. For example, a specific switching method may refer to the switching of the ODUk SNCP based on FIG. 5 when the transmission link from node A to intersection node F in the ODUk SNCP of the tangent rings fails in the above method embodiment, and will not be repeated herein.

In the above device embodiments, the virtual node establishing unit 1102 establishes two virtual nodes with two different transmission directions on the intersection node, and the connecting unit 1103 establishes connection between the service units on the intersection node through the virtual nodes. In this manner, when a failure occurs on the tangent rings, the switching unit only needs to switch the cross connection between the service units used by the failed ring and the virtual units without considering the state of non-failed ring, thus the coupling relations between different protections are reduced, the processing complexity is reduced, the switching time is shortened, and the protection reliability is improved.

The device embodiments are merely exemplary. Units described as separate components may be or may not be physically separated. Components shown as units may be or may not be physical units. That is, the components may be integrated, or distributed to a plurality of network units. Some or all of the modules may be selected to achieve the objective of the solution of the embodiment according to actual demands. Persons of ordinary skill in the art can understand and implement the present disclosure without creative efforts.

Through the descriptions of the preceding embodiments, those skilled in the art may understand that the present disclosure may be implemented by hardware only, or by software and a necessary universal hardware platform. However, in most cases, using software and a necessary universal hardware platform are preferred. Based on such understandings, all or part of the features under the present disclosure that makes contributions to the prior art may be essentially embodied in the form of a software product. The software product may be stored in a storage medium, which can be a Read-Only Memory (ROM), a Random Access Memory (RAM), a magnetic disk, or a Compact Disk Read-Only Memory (CD-ROM). The software product includes a number of instructions that enable a computer device (personal computer, server, or network device) to execute the methods provided in the embodiments of the present disclosure.

The above embodiments are merely provided for elaborating the features of the present disclosure, but not intended to limit the present disclosure. Any modification, equivalent replacement, or improvement made without departing from the spirit and principle of the present invention should fall within the scope of the present disclosure.

What is claimed is:

1. A method for realizing interaction of optical channel data unit (ODUk) protection tangent rings, comprising:
   for a shared protection ring ODUk SPRing in the tangent rings:
   selecting a node used for protection of the ODUk in the ODUk SPRing;
   selecting a sending service unit used by a protected service in the ODUk SPRing as a protected sending unit,
   selecting sending service units comprising a first sending working unit and a second sending working unit with two different transmission directions, and a first sending protection unit and a second sending protection unit with the two different transmission directions;
   selecting a receiving service unit used by the protected service in the ODUk SPRing as a protected receiving unit,
   selecting receiving service units comprising a first receiving working unit and a second receiving working unit with the two different transmission directions, and a first receiving protection unit and a second receiving protection unit with the two different transmission directions; and
   establishing a connection between a receiving service unit and the protected sending unit with the same transmission direction on the node, or establishing a connection between a sending service unit and the protected receiving unit with the same transmission direction on the node; and establishing two virtual nodes on the node when the node is an intersection node, and establishing connections between the receiving service unit and the protected sending unit, and between the sending service unit and the protected receiving unit respectively on each direction of two directions through one of the virtual nodes.

2. The method for interaction of the tangent rings according to claim 1, wherein the establishing connections between the receiving service unit and the sending unit, and between the sending service unit and the protected receiving unit respectively on each direction of the two directions through one of the virtual nodes comprises: connecting the receiving service unit used by the protected service to the first receiving service unit and the second receiving service unit respectively through one virtual node of the two virtual nodes; and connecting the sending service unit used by the protected service to the first sending service unit and the second sending service unit respectively through the other virtual node of the two virtual nodes.

3. The method for interaction of the tangent rings according to claim 1, wherein the sending working unit and the receiving working unit with the same transmission direction are the same line tributary unit; and the sending protection unit and the receiving protection unit with the same transmission direction are the same line tributary unit.

4. A method for realizing interaction of optical channel data unit (ODUk) protection tangent rings, comprising:
   for an ODUk subnet connection protection (SNCP) in the tangent rings:
   selecting a node used for protection of the ODUk in the ODUk SCNP;
   selecting a sending service unit used by a protected service in the ODUk SNCP as a protected sending unit,
   selecting a sending working unit and a sending protection unit with a transmission direction different from that of the sending working unit;
   selecting a receiving service unit used by the protected service in the ODUk SNCP as a protected receiving unit,
   selecting a receiving working unit with the same transmission direction as that of the sending working unit and a receiving protection unit with the same transmission direction as that of the sending protection unit; and
   establishing a connection between the receiving working unit and the protected sending unit through a first virtual node and a connection between the sending working unit and the protected receiving unit through a second virtual node.

* * * * *